US005683815A

United States Patent [19]
Leiss

[11] Patent Number: 5,683,815
[45] Date of Patent: Nov. 4, 1997

[54] SHEETING AND MOLDING MADE OF MULTI-PHASE PLASTIC AND ITS USE IN THE MANUFACTURE OF COMPOSITE SHEETING

[75] Inventor: Dirk Leiss, Isernhagen, Germany

[73] Assignee: Benecke-Kaliko AG, Hanover, Germany

[21] Appl. No.: 392,838

[22] PCT Filed: Jul. 1, 1994

[86] PCT No.: PCT/EP94/02157

§ 371 Date: Mar. 27, 1995

§ 102(e) Date: Mar. 27, 1995

[87] PCT Pub. No.: WO95/01400

PCT Pub. Date: Jan. 12, 1995

[30] Foreign Application Priority Data

Jul. 2, 1993 [DE] Germany ............... 43 22 145.9

[51] Int. Cl.$^6$ ............... B32B 27/00
[52] U.S. Cl. ............... 428/424.4; 428/424.7; 428/424.8
[58] Field of Search ............... 428/424.4, 424.7, 428/424.8

[56] References Cited

U.S. PATENT DOCUMENTS

| | | | |
|---|---|---|---|
| 5,248,546 | 9/1993 | Greenlee | 428/212 |
| 5,334,450 | 8/1994 | Zabrocki et al. | 428/332 |
| 5,409,986 | 4/1995 | Boudry et al. | 524/505 |
| 5,415,940 | 5/1995 | Ngoc et al. | 428/424.4 |

*Primary Examiner*—Helen Lee
*Attorney, Agent, or Firm*—McAulay Fisher Nissen Goldberg & Kiel, LLP

[57] ABSTRACT

The invention concerns a sheet or a molding of a multi-phase thermoplastic, comprising an elastomer-modified thermoplastic, a modifier and other usual additives, whereby the elastomer-modified thermoplastic is an acrylonitrile-styrene-acrylic ester copolymer (ASA) having an acrylic ester proportion of about 25 to 80 percent by weight and the desired hardness or softness of the ASA is controlled by incorporating a modifier, whereby 1) an external plasticizer in the form of a) a monomeric or oligomeric plasticizer usual for plasticizing PVC and/or b) an amorphous or partially crystalline plasticizer having a crystallinity not greater than 25% is incorporated in the ASA copolymer to soften a hard ASA copolymer, whereby the mixing ratio (weight/weight) of hard elastomer-modified acrylonitrile-styrene-acrylic ester copolymer (ASA) to the external plasticizer is about 9:1 to 1:1, and 2) a polymer having sufficient compatibility with the ASA copolymer and an E-modulus of $\geq 2000$ N/mm$^2$ is incorporated into the ASA copolymer to increase the hardness of a soft ASA copolymer, whereby the mixing ratio of soft ASA copolymer to hardening copolymer is from about 20:1 to 1:1. These sheets are particularly suited for use as a composite sheet for the interior lining of vehicles.

15 Claims, No Drawings

SHEETING AND MOLDING MADE OF MULTI-PHASE PLASTIC AND ITS USE IN THE MANUFACTURE OF COMPOSITE SHEETING

The invention concerns a sheet or a molding of a multi-phase thermoplastic comprising an elastomer-modified thermoplastic, one or more modifiers and, if desired, processing aids, coloring agents, stabilizers and other usual additives, as well as the use of the sheet to produce a composite sheet.

Sheets containing an elastomer-grafted styrene-acrylonitrile copolymer (ASA) are known from German Laid-Open Patent 34 29 523. These sheets contain as the modifiers chlorinated polyethylene (PEC), rubber-like ethylene-propylene copolymer (EPM) and/or a rubber-like terpolymer of ethylene, propylene and a diene (EPDM). The weight ratio of ASA to the particular modifier or mixture is from 8:2 to 3:7. It has been found that the EPM and EPDM are not as compatible with the ASA as would be desired. An undesired separation can occur during further processing. The particular disadvantage of the PEC is its chlorine content. Therefore it has been avoided for some time with respect to environmental protection.

German Laid-Open Patent 40 19 799 concerns sheets used especially as leather substitutes. They contain a thermoplastic polyurethane (A) and at least one partially cross-linked alkyl acrylate copolymer (B) of (B1) a $C_1$–$C_6$-alkylacrylate and (B2) acrylonitrile, styrene, vinyl acetate.

With respect to an analysis of the state of the technology and the consequences arising from it, the objective of this invention was to find polymeric and monomeric external plasticizers and also, if desired, hardening components for a sheet of the type described initially, which have the lowest possible crystallinity or are, in particular, amorphous, but which are specifically miscible with ASA. That should, especially, cause a reduction of the Shore Hardness D and the E-modulus in order to retain the most pleasant possible feel of the sheet. If monomeric external plasticizers are used they should be resistant to migration and should, if possible, have no effect on the fogging phenomenon that occurs when such sheets are used in vehicle interiors. Quite specifically, the invention focuses on the desired sheets or moldings having improved E-modulus and tear strength as compared with the state of the technology. Such a sheet would be intended for use primarily as a PVC substitute, whereby the specifications required in each case should be easily adjustable.

This objective is achieved according to the invention by the elastomer-modified thermoplastic being an acrylonitrile-styrene-acrylic ester copolymer (ASA) with an acrylic ester proportion of about 25 to 80% by weight, and the desired hardness or softness of the ASA copolymer being controlled by incorporating a modifier, whereby the modifier incorporated into the ASA copolymer 1) to soften a harder ASA copolymer is an external plasticizer in the form of a) a monomeric or oligomeric plasticizer commonly used to plasticize PVC, and/or b) an amorphous or partially crystalline polymeric plasticizer having a crystallinity not greater than 25% in the form of an ethylene-vinyl acetate copolymer (EVA), and ethylene-ethyl acrylate copolymer (EEA), an ethylene-butyl acrylate copolymer (EBA), a hydrogenated or non-hydrogenated styrene-butadiene-styrene block copolymer (SEBS or SBS) and/or a soft acrylonitrile-styrene-acrylic ester copolymer (ASA) having an acrylic ester proportion of about 70 to 80% by weight, whereby the mixing ratio (weight/weight) of hard elastomer-modified acrylonitrile-styrene-acrylic ester copolymer (ASA) to the external plasticizer is from about 9:1 to 1:1, and 2) to increase the hardness of a soft ASA copolymer is a polymer sufficiently compatible with the ASA copolymer and having an E-modulus of $\geq 2,000$ N/mm$^2$, whereby the mixing ratio of soft ASA copolymer to the hardening copolymer is from about 20:1 to 1:1.

Modification variation (1) will be described in detail in the following.

Within the framework of the invention, two different acrylonitrile-styrene-acrylic ester copolymers (ASA) can be used. In the following we speak of "elastomer-modified ASA" in the case of the elastomer-modified thermoplastic and of the ASA modifier in the case of ASA used as a modifier.

The mixing ratio of elastomer-modified ASA to the specified modifiers, in the case when a soft sheet is desired, is more toward the lower limit of about 1:1, particularly between about 2.5:1. If the hardness is to be made greater, then the mixing ratio is particularly from about 9:1 to 3:1.

The acrylic ester in elastomer-modified ASA, as well as in the ASA modifier, is not subject to any critical limitation. It can, for instance, be a $C_1$–$C_6$-alkyl ester, preferably butyl acrylate. If an "acrylic ester" is mentioned here, that should be understood to include a "methacrylate ester" as well.

The elastomer-modified ASA comprises preferably about 30 to 65% acrylic ester, especially about 43 to 63% by weight. By comparison, the ASA modifier comprises about 70 to 80% acrylic ester, especially about 70 to 75% acrylic ester. In any case, the properties of the sheet can be controlled or influenced by different proportions of alkyl acrylate, especially butyl acrylate. Another potential means of control is by mechanically mixing the elastomer-modified ASA with an acrylonitrile-butyl acrylate copolymer, whereby this mixture preferably comprises about 50 to 70% by weight of elastomer-modified ASA, particularly about 58 to 63% by weight elastomer-modified ASA.

It is important for the purpose of the invention that the polymeric modifier under discussion have the lowest possible crystallinity, less than about 25%, better less than about 15%, and still better less than about 5%. Particularly advantageous results are obtained with an amorphous modifier. In a particular case it may not be possible, due to the specific chemical properties of the modifier, to make it completely amorphous. Within the meaning of the invention, these polymeric modifiers include ethylene-butyl acrylate copolymer, which has partial crystallinity within the limits stated above. One common commercial product is characterized by the following properties:

melting point about 50° C., tensile strength in MPa 3.2, elongation 1060%, Shore hardness A about 56 and melt index about 12 g/10 minutes (190° C., 2.16 kg). The partial crystallinity, or the amorphous character, can be determined by DSC (Differential Scanning Calorimetry). This method is described in the literature source "Polymer Analysis", Volumes I and II, 1977, by M. Hoffmann, H. Krömer and R. Kuhn, Thieme Verlag, Stuttgart.

If an external polymeric plasticizer is advantageous in particular cases, then the modifiers EVA, EEA, EBA and the "soft" ASA modifier are preferred. Of these, an EBA and EEA having crystallinity less than 15% are preferred. The EVA has preferably a vinyl acetate content of about 45 to 80% by weight, especially about 60 to 70% by weight.

The following list presents more details of polymeric modifiers usable in the sense of the invention:

EVA: Melt index (190° C./2.16 kg) less than 6.0 g/10 min, especially 2 to 6 g/10 min. Glass transition temperature $T_g <-15°$ C. (these data apply for a VA content of about $63\pm2\%$ by weight);

VA content of 68%: melt index (190° C./2.16 kg) about 30 g/10 min, preferably about 25 to 35 g; $t_g <-10°$ C.;

Ethylene-butyl acrylate: Melt index (190° C./2.16 kg) about 10 to 15 g/10 min, especially about 10 to 13 g/10 min; melting point about 50° C., tensile strength about 3 MPa (determined according to DIN 52 910), Shore hardness A about 50 to 60, especially about 55 (determined according to DIN 53 505); butyl acrylate content about 30% by weight;

SEBS: Styrene content about 25 to 35% by weight of the rubber component, especially about 30% by weight, Shore hardness A 20 to 80, especially about 75, elongation about 300 to 800% (determined according to DIN 52 910), especially about 400 to 600% and very particularly about 500%, tensile strength about 5 MPa (determined according to DIN 52 910);

SBS: Styrene, in relation to the rubber content, about 10 to 20, especially about 13 to 18%, Shore hardness A about 45 to 65, especially about 55; elongation 700 to 1300%, especially about 900 to 1100% (determined according to DIN 52 910), tensile strength about 1 MPa (determined according to DIN 52 910);

ASA modifier: Shore hardness A about 50 to 60, especially about 55; tensile strength (according to DIN 52 910) about 4 to 8, especially about 6; elongation (determined according to DIN 52 910 about 250 to 400, especially about 300%; glass transition temperature $T_g <-10°$ C.

The usual monomeric and preferably oligomeric plasticizers known in the state of the technology can be used within the meaning of the invention, alone or mixed with the above-named polymeric plasticizers. These are, particularly, phthalates (phthalic acid esters) such as dioctyl phthalate (DOP), diisononyl phthalate (DINP), diisodecyl phthalate (DIDP), dibutyl phthalate (DBP), diisobutyl phthalate (DIBP), dicyclohexyl phthalate (DCHP), dimethyl phthalate (DMP), diethyl phthalate (DEP), benzyl-butyl phthalate (BBP), butyl-octyl phthalate, butyl-decyl phthalate, dipentyl phthalate, dimethylglycol phthalate, dicapryl phthalate (DCP) and the like; trimellitates, such as, in particular, trimellitic acid esters with (predominantly) linear $C_6$ to $C_{11}$ alcohols with low volatility and good cold elasticity, acyclic (aliphatic) dicarboxylic acid esters, such as, in particular, esters of adipic acid, such as dioctyl adipate (DOA), diisodecyl adipate (DIDA), especially mixed with phthalates; dibutyl sebacate (DBS), dioctyl sebacate (DOS) and esters of azelaic acid, especially mixed with phthalates, dibutyl sebacate; oligomeric plasticizers such as polyesters of adipic, sebacic, azelaic and phthalic acid with diols such as 1,3-butanediol, 1,2-propanediol, 1,4-butanediol, and 1,6-hexanediol, and with triols such as, especially, glycerin and more highly functional alcohols, phosphates (phosphoric acid esters), especially tricresyl phosphate (TCP), triphenyl phosphate (TPP), diphenyl cresyl phosphate (DPCP), diphenyloctyl phosphate (DPOP), tris-(2-ethylhexyl) phosphate (TOP), tris-2-butoxyethyl) phosphate, fatty acid esters, such as, in particular, butyl stearate, methyl and butyl esters of acetylated ricinol fatty acid, triethylene glycol-bis-(2-ethylbutyrate), hydroxycarboxylic acid esters such as, in particular, citric acid esters, tartaric acid esters, lactic acid esters, epoxide plasticizers, such as, in particular, epoxidized fatty acid derivatives, especially triglycerides and monoesters, and the like, such as are known particularly as PVC plasticizers. In this connection, see Römpp Chemie Lexikon, 9th Ed., Vol. 6, 1992, pp. 5017–5020.

In individual cases it can be advantageous to use a mixture of a liquid monomeric plasticizer, especially in the form of a trimellitic acid or phthalic acid ester, and a polymeric modifier (b) for external plasticizing. Thereby the mixing ratio of polymeric plasticizer to monomeric plasticizer is preferably from about 2:1 to 1:2, especially about 1:1.

The modification variation (2) according to the invention will be described in detail in the following.

The polymers that are sufficiently compatible with ASA and which have an E-modulus of $\geq 2,000$ N/mm² include, in particular, SAN, α-SAN, acrylonitrile-alkyl acrylate copolymers, acrylonitrile-acrylmethacrylate copolymers, ASA, methacrylate-butadiene-styrene copolymer, ABS, PC, polyether, polyurethane and SBR, individually or in mixtures.

The mixing ratio previously mentioned above is preferably from about 9:1 to 7:3 for the modification variation 2.

A further object of the invention is a composite sheet with a substrate, especially in the form of a polyolefin foam, polyurethane foam, or a textile structure, with a sheet according to the invention laminated onto it. The polyolefin foam is preferably a polypropylene and/or polyethylene foam. Such composite sheets are used advantageously in the interior finishing of vehicles of all types.

The following discussions concern both the modification variation (1) and modification variation (2), to the extent that one of the two variations alone is obviously being discussed.

If a multi-phase thermoplastic is discussed in the sense of this invention, then it is to be understood to include alloys and the like. This is particularly the case in connection with the modification according to the invention by which the deep drawing ability is improved by incorporating ABS and SAM. At the same time, that improves the resistance to heat warping and the flow behavior in deep drawing and calendering. ABS and SAN in particular have an advantageous effect on the resistance to scarring.

In the practical realization of this invention, various other substances, such as have already been mentioned as processing aids, coloring agents, stabilizers and other usual additives, can also be used. Processing aids used particularly include, in particular, $C_{12}$–$C_{36}$ fatty acids, fatty alcohols, fatty alcohols and amines; coloring agents used include organic dyes and pigments such as titanium dioxide and carbon black; stabilizers include sterically hindered phenols, hydroquinone, benzotriazole, benzophenone or sterically hindered amines; other usual additives include fillers, for instance, such as, in particular, carbon black, talc, chalk and the like.

The sheets or moldings according to the invention are used particularly to replace corresponding sheets or moldings based on PVC. There is a certain advantage in that the known PVC materials can be adjusted to any desired hardness with the usual plasticizers. On the other hand, they have many well-known disadvantages, such as poor degradability and, thus, suspicion about them in recycling concepts. It has been found, surprisingly, that through the teaching of the invention it is possible to provide replacements for any PVC material with an equally suitable substitute based on soft or hard elastomer-modified ASA materials. No relevant problems arise here. If a sufficiently soft ASA material is already available, any desired hardness can be attained by incorporating the harder components according to modification variation (2). On the other hand, the hardness of harder ASA starting materials can be reduced according to modification variation (1). Which of the two variations, (1) or (2), is finally selected depends on the particular PVC material to be replaced. Thus a suitable PVC substitute can be attained elegantly, without problems, by simple control in the sense of this invention.

The thermoplastics from which the sheets or moldings according to the invention are produced are distinguished by the desirable resistance to weathering. If the sheet or molding is produced with this material according to the invention, then these objects show excellent resistance to scarring, good melt resistance, and particularly good deep-drawing ability, especially for the modification discussed above with ABS and/or SAN incorporated. That appears with the various deep-drawing processes, especially the vacuum deep-drawing process. Deep-drawn parts or composite structures made with the sheet according to the invention can be used with particular advantage in aircraft and vehicles, especially for the inside finish of vehicles or portions of the finish, preferably switchboards or valve panels, columns, vehicle side linings, door linings and trays. The sheet according to the invention can also be cemented, with or without reshaping, to quite different surfaces or three-dimensional substrates, using the usual techniques. It can be produced with other layers, such as protective layers. Finally, adhesive layers can be put on the back, laminated or bonded, if desired with suitable foam layers. There are also good possibilities for surface shaping, such as application of stampings, printed decorations and coatings improving the surface appearance. It is a particular advantage that the sheet according to the invention is free from halogens. Thus it is a desirable substitute for the PVC-containing sheets previously used in the applications discussed.

The invention is explained in more detail in the following by means of 9 examples:

EXAMPLES 1 TO 7 (MODIFICATION VARIATION 1)

The chemicals specified in more detail in the following examples of formulas will first be defined as follows:

From the formulas shown in the following table, either a basic sheet about 0.5 mm thick was made on a 5-roll calender, or a 3-layer composite sheet was made on a 5-roll calender with subsequent thermal lamination (depending on the application). The properties of the different sheets were measured. They are also shown in Table I, following).

TABLE I

| Raw material | Composition (% by weight) Example | | | | | | |
|---|---|---|---|---|---|---|---|
| | 1 | 2 | 3 | 4 | 5 | 6 | 7 |
| ASA (with 40% by weight butyl acrylate rubber) (mixed with acrylonitrile-butyl acrylate copolymer (NAR), weight ratio ASA:NAR 6:4 | 85 | 70 | −59 | 85 | 75 | −80 | 85 |
| ASA (with 60% by weight butyl acrylate rubber) | — | — | — | — | — | | — |
| EVA (68% vinyl acetate by wt.) | — | — | — | — | 7 | — | — |
| EVA (63% vinyl acetate by wt.) | — | — | — | 10 | — | — | — |
| EVA (.30% by wt. butyl acrylate) | — | 20 | — | — | — | — | — |
| Trimellitic acid ester ($C_6$–$C_9$-straight chain/ester function) | — | — | 7 | 5 | 8 | — | — |
| ASA (72% rubber by wt.) | 15 | — | 19 | — | — | — | — |
| Adipic acid polyester I (viscosity at 50° C.: 1000–3000 mPas/acid number (AN) $\leq$ 1 mg KOH per gram of plasticizer/density at 50° C.:, 1.0–1.3 g/cm$^3$ | — | — | — | — | — | — | 15 |
| Adipic acid polyester II (viscosity at 20° C.: 1000–19000 mPAS/AN $\leq$ 2.5 mg KOH/g plasticizer; density at 50° C.: 1.0–1.2 g/cm$^3$ Agent to improve deep-drawing ability | — | — | — | — | — | 20 | — |
| ABS (copolymer ratio: 29:16:55 (% by weight) | — | −10 | 10 | — | 5 | — | — |
| SAN (copolymer ratio: (% by weight) 68:32) Additive | — | — | 5 | — | — | — | — |
| Filler: carbon black UV absorber | 6 | 6 | 6 | 6 | 6 | 6 | 6 |
| Sterically hindered phenol (Ciba Geigy Tinuvin$^R$ 770) | 0.3 | 0.3 | 0.3 | 0.3 | 0.3 | 0.3 | 0.3 |
| Benzotriazole derivative (Ciba Geigy Tinuvin$^R$ 234) Primary antioxidant | 0.2 | 0.2 | 0.2 | 0.2 | 0.2 | 0.2 | 0.2 |
| Benzotriazol (Ciba Geigy Irganox$^R$ 1010) Properties | 0 | 0 | 0 | 0 | 0 | 0 | 0.2 |
| Hardness (Shore D/A 15s) | 29 | 36 | 33 | 29 | 36 | 10/62 | 20/82 |

TABLE I-continued

| | Composition (% by weight) Example | | | | | | |
|---|---|---|---|---|---|---|---|
| Raw material | 1 | 2 | 3 | 4 | 5 | 6 | 7 |
| (DIN 53 505) | | | | | | | |
| E-modulus (N/mm$^2$) (DIN 52 910) | 90 | 140 | 40 | 90 | 150 | <1 | 38 |
| Tensile strength in N (DIN 52 910) | 40 | 170 | 30 | 100 | 90 | 4.1 | 16.7 |
| Tearing resistance (N/mm$^2$ (DIN 52 910) | 10 | 10 | 12 | 10 | 11 | 4.9 | 9.1 |
| Elongation at break (DIN 52 910) | 150 | 130 | 110 | 250 | 180 | 230 | 320 |

The sheets according to the invention are used in accordance with the desired application, for instance, according to the degrees of hardness or the deep-drawing properties desired in a particular case. Thus the special flexibility of this invention appears in relation to the quite different applications. Aside from the fact that the sheet can be deep-drawn, it meets all the basic requirements of a specification, i.e., a light-fastness according to DIN 75 202, three cycles, judged by the gray scale, of equal to or greater than 4; fogging value according to DIN 75 201 (100° C./3 hours) of more than 90% remaining gloss; and condensate according to DIN 75 201 (100° C./16 hours) of less than 1 mg.

EXAMPLES 8 AND 9 (MODIFICATION VARIATION 2)

The materials specified in Table II, following, were processed according to the statement in the preceding examples 1 to 7. The raw materials used and the properties determined are shown in Table II, following.

TABLE II

| | Composition (percent by weight) Examples | |
|---|---|---|
| Raw Materials | 8 | 9 |
| ASA (with 72% by weight butyl acrylate rubber) | 90 | 80 |
| Modifiers | | |
| ABS (copolymer ratio 29:16:55 (percent by weight) | 5 | 15 |
| SAN (copolymer ratio 68:32) (percent by weight) | 5 | 5 |
| Additives | | |
| Filler: carbon black | 6 | 6 |
| UV absorbers | | |
| Sterically hindered phenol (Ciba Geigy Tinuvin$^R$ 770) | 0.3 | 0.3 |
| Benzotriazole derivative (Ciba Geigy Tinuvin$^R$ 234) | 0.2 | 0.2 |
| Primary antioxidant | | |
| Benzotriazole (Ciba Geigy Irqanox$^R$ 1010) | 0.2 | 0.2 |
| Properties | | |
| Hardness (Shore D/A 15s) DIN 53 505 | 18/75 | 21/88 |
| E-modulus (N/mm$^2$) DIN 52 910 | 60 | 160 |

TABLE II-continued

| | Composition (percent by weight) Examples | |
|---|---|---|
| Raw Materials | 8 | 9 |
| Tensile strength in N DIN 52 910 | 20 | 40 |
| Tearing resistance (N/mm$^2$) DIN 52 910 | 5.5 | 12 |
| Elongation at break (%) DIN 52 910 | 220 | 150 |

I claim:

1. Sheet or molded body formed of a polyphase thermoplastic plastic containing elastomer modified acrylonitrile-styrene-acrylic ester copolymer (ASA) having an acrylic ester percentage of 25 to 65% by weight and a modifying external plasticizer, the mixture ratio (weight/weight) of elastomer-modified acrylonitrile-styrene-acrylic ester copolymer (ASA) to the modifying external plasticizer being 9:1 to 1:1, and the modifying external plasticizer selected from the group consisting of:

I. a combination of
   a) a monomeric or oligomeric plasticizer selected from the group consisting of phthalates, trimellitates, acyclic (aliphatic) dicarboxylic acid esters, polyesters of adipic, sebacic, azelaic and phthalic acid with diols, triols and more highly functional alcohols, phosphates (phosphates (acid esters), fatty acid esters, triethylene glycol-bis-(2-ethylbutyrate), hydroxycarboxylic acid esters, epoxide plasticizers; and
   b) an amorphous or partially crystalline polymeric plasticizer having a crystallinity of at most 25% selected from the group consisting of an ethylene-vinyl acetate copolymer (EVA), an ethylene-butyl acrylate copolymer (EBA), a hydrogenated styrene-butadiene-styrene block copolymer, a non-hydrogenated styrene-butadiene-styrene block copolymer (SEBS or SBS), acrylonitrile-styrene-acrylic ester copolymer (ASA) having an acrylic ester percentage of 70 to 80% by weight, and mixtures thereof, wherein the mixture weight/weight ratio of polymeric plasticizer b) to monomeric or oligomeric plasticizer a) is 2:1 to 1:2;

II. a monomeric or oligomeric plasticizer selected from the group consisting of phthalates, trimellitates, acyclic (aliphatic) dicarboxylic acid esters, polyesters of adipic, sebacic, azelaic and phthalic acid with diols, triols and more highly functional alcohols, phosphates (phosphates (phosphoric acid esters), fatty acid esters, triethylene glycol-bis-(2-ethylbutyrate), hydroxycarboxylic acid esters, epoxide plasticizers; and III. an amorphous or partially crystalline polymeric plasticizer having a crystallinity of at most 25% in the form of an ethylene-butyl acrylate copolymer (EBA), and/or acrylonitrile-styrene-acrylic ester copolymer (ASA) having an acrylic ester percentage of 70 to 80% by weight.

2. The sheet or molded body according to claim 1, wherein the external plasticizer is a combination of trimellitic acid ester and polymeric plasticizer b).

3. The sheet or molded body according to claim 1, wherein the proportion of acrylic ester in the ASA of the modifying external plasticizer is 70 to 75% by weight.

4. The sheet or molded body according to claim 1, wherein the polymeric external plasticizers have a crystallinity of less than 15%.

5. The sheet or molded body according to claim 4, wherein the polymeric external plasticizers have a crystallinity of less than 5%.

6. The sheet or molded body according to claim 4, wherein the polymeric external plasticizers are amorphous.

7. The sheet or molded body according to claim 1, wherein the polymeric external plasticizer is selected from the group consisting of an amorphous EVA, an amorphous ASA, an ethylene-butyl acrylate copolymer having a crystallinity of less than 15%, and combinations thereof.

8. The sheet or molded body according to claim 7, wherein the amorphous EVA has a vinyl acetate content of 45 to 80% by weight.

9. The sheet or molded body according to claim 1 wherein the acrylic ester in the ASA is a butyl acrylate.

10. The sheet or molded body according to claim 1 wherein the proportion of acrylic ester in the ASA of the elastomer-modified thermoplastic is 30 to 65% by weight.

11. The sheet or molded body according to claim 1 which further comprises a styrene copolymer in the form of an acrylonitrile-butadiene-styrene copolymer, a styrene-acrylonitrile copolymer (SAN), or combinations thereof.

12. A laminate comprising a substrate layer and a layer of the sheet of claim 1.

13. The laminate of claim 12 wherein the substrate is a polyolefin foam, or a textile.

14. The laminate of claim 13 wherein the substrate is a polyolefin foam selected from the group consisting of polypropylene foam, polyethylene foam, and combinations thereof.

15. A laminate comprising a substrate layer and a layer of the formed of a polyphase thermoplastic plastic containing an acrylonitrile-styrene-acrylic ester copolymer (ASA) having an acrylic ester percentage of 25 to 65% by weight and a modifying external plasticizer, the mixture ratio (weight/weight) of elastomer-modified acrylonitrile-styrene-acrylic ester copolymer (ASA) to the modifying external plasticizer is 9:1 to 1:1, and the modifying external plasticizer selected from the group consisting of:

I. a combination of
  a) a monomeric or oligomeric plasticizer selected from the group consisting of phthalates, trimellitates, acyclic (aliphatic) dicarboxylic acid esters, polyesterss of adipic, sebacic, azelaicc and phthalic acid with diols, triols and more highly functional alcohols, phosphates (phosphates (phosphoric acid esters), fatty acid esters, triethylene glycol-bis-(2-ethylbutyrate), hydroxycarboxylic acid esters, epoxide plasticizers; and
  b) an amorphous or partially crystalline polymeric plasticizer having a crystallinity of at most 25% selected from the group consisting of an ethylene-vinyl acetate copolymer (EVA), an ethylene-butyl acrylate copolymer (EBA), a hydrogenated styrene-butadiene-styrene block copolymer, a non-hydrogenated styrene-butadiene-styrene block copolymer (SEBS or SBS), acrylonitrile-styrene-acrylic ester copolymer (ASA) having an acrylic ester percentage of 70 to 80% by weight, and mixtures thereof, wherein the mixture weight/weight ratio of polymeric plasticizer b) to monomeric or oligomeric plasticizer a) is 2:1 to 1:2;

II. a monomeric or oligomeric plasticizer selected from the group consisting of phthalates, trimellitates, acyclic (aliphatic) dicarboxylic acid esters, polyesterss of adipic, sebacic, azelaicc and phthalic acid with diols, triols and more highly functional alcohols, phosphates (phosphates (phosphoric acid esters), fatty acid esters, triethylene glycol-bis-(2-ethylbutyrate), hydroxycarboxylic acid esters, epoxide plasticizers; and III. an amorphous or partially crystalline polymeric plasticizer having a crystallinity of at most 25% in the form of an ethylene-butyl acrylate copolymer (EBA), a non-hydrogenated styrene-butadiene-styrene block copolymer (SBS) and/or acrylonitrile-styrene-acrylic ester copolymer (ASA) having an acrylic ester percentage of 70 to 80% by weight.

* * * * *

UNITED STATES PATENT AND TRADEMARK OFFICE
CERTIFICATE OF CORRECTION

PATENT NO. : 5,683,815
DATED : November 4, 1997
INVENTOR(S) : Dirk Leiss

It is certified that error appears in the above-identified patent and that said Letters Patent is hereby corrected as shown below:

Title page, item [75], inventor: should read--Dirk Leiss, Grossburgwedel, Germany--.

Signed and Sealed this

Thirteenth Day of January, 1998

Attest:

BRUCE LEHMAN

*Attesting Officer*   *Commissioner of Patents and Trademarks*